United States Patent
Hu et al.

(10) Patent No.: US 9,736,336 B2
(45) Date of Patent: Aug. 15, 2017

(54) IMAGE TONE ADJUSTMENT METHOD, APPARATUS THEREOF AND COMPUTER STORAGE MEDIUM

(71) Applicant: Tencent Technology (Shenzhen) Company Limited, Shenzhen, Guangdong (CN)

(72) Inventors: Shimin Hu, Guangdong (CN); Jianyu Wang, Guangdong (CN); Baoli Li, Guangdong (CN); Haifeng Deng, Guangdong (CN); Xianying Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 18 days.

(21) Appl. No.: 14/802,755

(22) Filed: Jul. 17, 2015

(65) Prior Publication Data
US 2015/0326753 A1 Nov. 12, 2015

Related U.S. Application Data

(63) Continuation of application No. PCT/CN2013/087510, filed on Nov. 20, 2013.

(30) Foreign Application Priority Data

Jan. 22, 2013 (CN) .......................... 2013 1 0023405

(51) Int. Cl.
*G06K 9/00* (2006.01)
*H04N 1/60* (2006.01)
(Continued)

(52) U.S. Cl.
CPC ............. *H04N 1/6008* (2013.01); *G06T 5/00* (2013.01); *H04N 1/407* (2013.01); *H04N 1/6027* (2013.01)

(58) Field of Classification Search
CPC .......... G06T 5/001; G06T 2207/20172; H04N 1/6008; H04N 1/407; H04N 1/6027
See application file for complete search history.

(56) References Cited

U.S. PATENT DOCUMENTS 8,610,741 B2 * 12/2013 Szeliski ................ G06T 7/0028
345/629
8,902,335 B2 * 12/2014 Doepke ................. G06T 3/4038
348/218.1

(Continued)

FOREIGN PATENT DOCUMENTS

| CN | 101150650 | 3/2008 |
|---|---|---|
| CN | 101651786 | 2/2010 |
| JP | 2009260542 | 11/2009 |

OTHER PUBLICATIONS

International Search Report issued in corresponding application PCT/CN2013/087510, 8 pages, dated Feb. 27, 2014.

*Primary Examiner* — Jonathan S Lee
(74) *Attorney, Agent, or Firm* — Brinks Gilson & Lione (57) ABSTRACT

The disclosure relates to an image tone adjustment method, an apparatus thereof, and a computer-readable storage medium. The method includes: fitting overlapping areas to obtain a first correction parameter and a second correction parameter, performing interpolation on each pixel of the target image to obtain a corresponding correction parameter, correcting the target image according to the corresponding correction parameters; fitting an overlapping area between the corrected target image and the first image, and an overlapping area between the corrected target image and the second image to obtain a first RGB three-channel linear transformation parameter and a second RGB three-channel linear transformation parameter, performing linear interpolation on each pixel of the corrected target image to obtain (Continued)

a corresponding RGB three-channel linear transformation parameter, and transforming the corrected target image.

20 Claims, 4 Drawing Sheets

(51) Int. Cl.
  H04N 1/407 (2006.01)
  G06T 5/00 (2006.01)

(56) References Cited

U.S. PATENT DOCUMENTS

| | | | | |
|---|---|---|---|---|
| 8,957,944 B2* | 2/2015 | Doepke | .............. | H04N 5/23238 348/211.4 |
| 9,088,714 B2* | 7/2015 | Doepke | .............. | H04N 5/23238 |
| 9,098,922 B2* | 8/2015 | Tico | ................. | G06T 3/4038 |
| 9,247,133 B2* | 1/2016 | Doepke | ................. | G06T 7/0034 |
| 9,251,612 B2* | 2/2016 | Guo | ................. | G06T 11/60 |
| 2002/0140829 A1* | 10/2002 | Colavin | .................. | G06T 3/403 348/231.99 |
| 2006/0177150 A1* | 8/2006 | Uyttendaele | .......... | G06T 3/4038 382/284 |
| 2007/0160311 A1* | 7/2007 | Edwards | .............. | H04N 1/3876 382/284 |
| 2008/0170804 A1* | 7/2008 | Zhang | ..................... | G06K 9/32 382/284 |
| 2010/0104176 A1* | 4/2010 | Hayase | ................ | H04N 1/3871 382/162 |
| 2012/0314945 A1* | 12/2012 | Cha | ........................ | G06T 3/4038 382/167 |
| 2016/0086379 A1* | 3/2016 | Sadi | ........................ | G06T 19/006 345/633 |
| 2016/0088287 A1* | 3/2016 | Sadi | ........................ | H04N 19/54 348/43 |

* cited by examiner

IMAGE TONE ADJUSTMENT METHOD, APPARATUS THEREOF AND COMPUTER STORAGE MEDIUM

CROSS REFERENCE TO RELATED APPLICATIONS

The application is a continuation application of International Application PCT/CN2013/087510 filed on Nov. 20, 2013, titled "IMAGE TONE ADJUSTING METHOD, ADJUSTING APPARATUS AND COMPUTER STORAGE MEDIUM", which claims priority to Chinese Patent Application No. 201310023405.2, filed on Jan. 22, 2013 with the Chinese Patent Office, titled "IMAGE TONE ADJUSTMENT METHOD, APPARATUS THEREOF AND COMPUTER STORAGE MEDIUM", both of which are incorporated herein by reference in their entireties.

TECHNICAL FIELD

The present disclosure relates to the field of image processing, and in particular, to an image tone adjustment method, an apparatus thereof, and a computer storage medium.

BACKGROUND

Image processing is an important research subject in computer graphics. In image processing, image tone adjustments are studied widely in recent years, for example, an Adobe formula provides a tone adjustment function in software Photoshop CS5, and a user can adjust tone of an image only with little interaction.

At present, the image tone adjustments, especially tone mapping for a high-dynamic range (HDR) image, are mostly performed on a single image. While the tone adjustments for a single image are widely studied, a tone adjustment for multiple images, especially for multiple images with continuous content, which makes the luminance of multiple images to be consistent, is not achieved.

SUMMARY

In view of above, it is necessary to provide an image tone adjustment method with which consistent luminance of multiple images can be achieved by adjusting tones of the multiples images.

In addition, it is also necessary to provide an image tone adjustment apparatus with which consistent luminance of multiple images can be achieved by adjusting tones of the multiples images.

An image tone adjustment method is provided, which includes:

fitting an overlapping area between a target image and a first image to obtain a first correction parameter, and fitting an overlapping area between the target image and a second image to obtain a second correction parameter, where a portion of the target image at a first side overlaps with the first image, and a portion of the target image at a second side overlaps with the second image;

performing interpolation on each pixel of the target image according to the first correction parameter and the second correction parameter to obtain a corresponding correction parameter, and correcting the target image according to the corresponding correction parameters;

fitting an overlapping area between the corrected target image and the first image to obtain a first RGB three-channel linear transformation parameter, and fitting an overlapping area between the corrected target image and the second image to obtain a second RGB three-channel linear transformation parameter; and performing linear interpolation on each pixel of the corrected target image according to the first RGB three-channel linear transformation parameter and the second RGB three-channel linear transformation parameter, to obtain a corresponding RGB three-channel linear transformation parameter, and transforming the corrected target image according to the corresponding RGB three-channel linear transformation parameters.

An image tone adjustment apparatus is provided, which includes:

a correction parameter acquisition module, configured to fit an overlapping area between a target image and a first image to obtain a first correction parameter, and fit an overlapping area between the target image and a second image to obtain a second correction parameter, where a portion of the target image at a first side overlaps with the first image, and a portion of the target image at a second side overlaps with the second image;

a correction module, configured to perform interpolation on each pixel of the target image according to the first correction parameter and the second correction parameter to obtain a corresponding correction parameter, and correct the target image according to the corresponding correction parameters;

a transformation parameter acquisition module, configured to fit an overlapping area between the corrected target image and the first image to obtain a first RGB three-channel linear transformation parameter, and fit an overlapping area between the corrected target image and the second image to obtain a second RGB three-channel linear transformation parameter; and a transformation module, configured to perform linear interpolation on each pixel of the corrected target image according to the first RGB three-channel linear transformation parameter and the second RGB three-channel linear transformation parameter, to obtain a corresponding RGB three-channel linear transformation parameter, and transform the corrected target image according to the corresponding RGB three-channel linear transformation parameters.

One or more computer storage mediums including computer-executable instructions are provided, the computer-executable instructions are used for executing an image tone adjustment method, and the method includes fitting an overlapping area between a target image and a first image to obtain a first correction parameter, and fitting an overlapping area between the target image and a second image to obtain a second correction parameter, where a portion of the target image at a first side overlaps with the first image, and a portion of the target image at a second side overlaps with the second image;

performing interpolation on each pixel of the target image according to the first correction parameter and the second correction parameter to obtain a corresponding correction parameter, and correcting the target image according to the corresponding correction parameters;

fitting an overlapping area between the corrected target image and the first image to obtain a first RGB three-channel linear transformation parameter, and fitting an overlapping area between the corrected target image and the second image to obtain a second RGB three-channel linear transformation parameter; and performing linear interpolation on each pixel of the corrected target image according to the first RGB three-channel linear transformation parameter and the second RGB three-channel linear transformation parameter, to obtain a corresponding RGB three-channel linear transformation parameter, and transforming the corrected target image according to the corresponding RGB three-channel linear transformation parameters.

According to the foregoing image tone adjustment method, the apparatus thereof, and the computer storage medium, an overlapping area between a target image and a first image is fitted to obtain a first correction parameter, and an overlapping area between the target image and a second image is fitted to obtain a second correction parameter; linear interpolation is performed on each pixel of the target image according to the first correction parameter and the second correction parameter to obtain a corresponding correction parameter, and the target image is corrected according to the corresponding correction parameters; an overlapping area between the corrected target image and the first image is fitted to obtain a first RGB three-channel linear transformation parameter, and an overlapping area between the corrected target image and the second image is fitted to obtain a second RGB three-channel linear transformation parameter, thereby obtaining a RGB three-channel linear transformation parameter corresponding to each pixel, and the target image is transformed according to the transformation parameters. In this way, the luminances of the first image, the target image, and the second image can be adjusted to be consistent, and color transition is smooth.

DETAILED DESCRIPTION OF EMBODIMENTS

The following describes the technical solutions of an image tone adjustment method and an adjustment apparatus thereof in detail in conjunction with embodiments and the drawings to make the technical solutions more clear.

Figure 1:
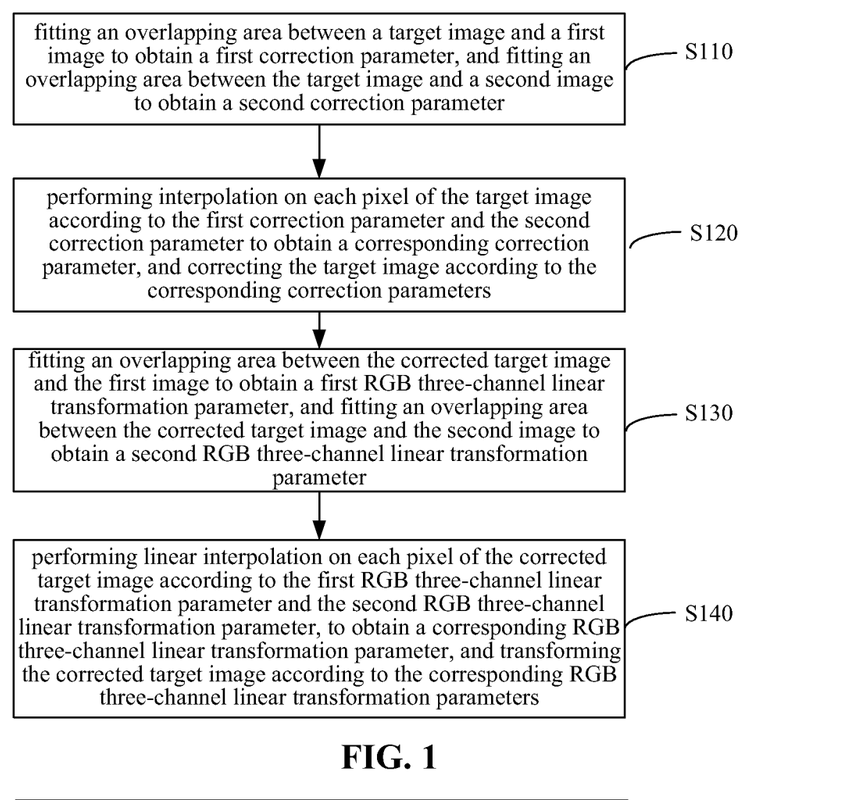
FIG. 1 is a schematic flowchart of an image tone adjustment method according to an embodiment.

As shown in FIG. 1, in an embodiment, the image tone adjustment method includes the following steps S110 to S140.

Step S110 includes: fitting an overlapping area between a target image and a first image to obtain a first correction parameter, and fitting an overlapping area between the target image and a second image to obtain a second correction parameter.

The first image, the target image, and the second image which have continuous content are acquired, where a portion of the target image at a first side overlaps with the first image, and a portion of the target image at a second side overlaps with the second image. For easy description, the first image is L, the target image is I, the second image is R, the first image L overlaps with the left portion of the target image I, and the second image R overlaps with the right portion of the target image I.

Figure 2:
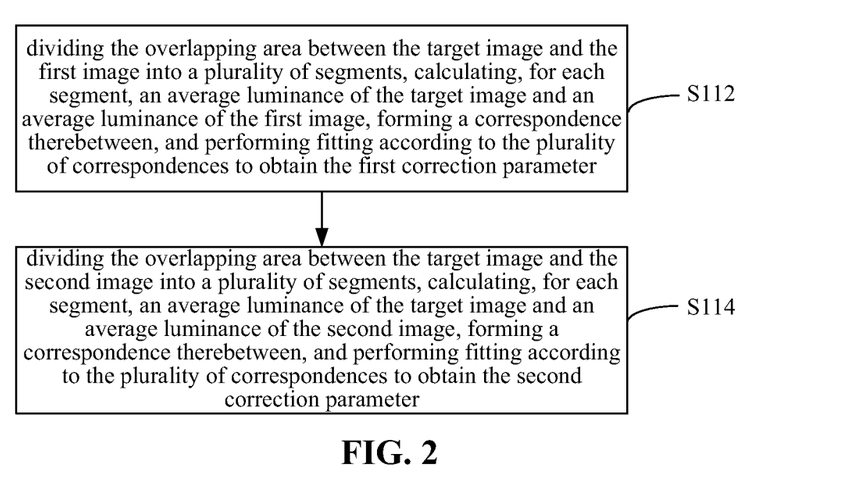
FIG. 2 is a schematic flowchart of a step of fitting an overlapping area between a target image and a first image to obtain a first correction parameter, and fitting an overlapping area between the target image and a second image to obtain a second correction parameter.

In an embodiment, as shown in FIG. 2, step S110 includes step S112 and step S114.

Step S112 includes: dividing the overlapping area between the target image and the first image into a plurality of segments, calculating, for each segment, an average luminance of the target image and an average luminance of the first image, forming a correspondence therebetween, and performing fitting according to the plurality of correspondences to obtain the first correction parameter.

Specifically, the plurality of segments may be set as needed, for example, 10 segments, or 20 segments. Taking 10 segments as an example, the overlapping area between the target image I and the first image L is divided into 10 segments; the average luminance of the target image I and the corresponding average luminance of the first image L in each segment are calculated; a correspondence between the average luminance of the target image I and the average luminance of the first image L in each segment is formed, and therefore, there are ten correspondences; an optimal gamma correction parameter, i.e., the first correction parameter, is obtained by performing fitting using the least square method. Gamma refers to nonlinear correction of an image.

Step S114 includes: dividing the overlapping area between the target image and the second image into a plurality of segments, calculating, for each segment, an average luminance of the target image and an average luminance of the second image, forming a correspondence therebetween, and performing fitting according to the plurality of correspondences to obtain the second correction parameter.

Specifically, the plurality of segments may be set as needed, for example, 10 segments, or 20 segments. Taking 10 segments as an example, the overlapping area between the target image I and the second image R is divided into 10 segments; the average luminance of the target image I and the corresponding average luminance of the second image R in each segment are calculated; a correspondence between the average luminance of the target image I and the average luminance of the second image R in each segment is formed, and therefore, there are ten correspondences; an optimal gamma correction parameter, i.e., the second correction parameter, is obtained by performing fitting using the least square method.

The sequence of step S112 and step S114 may be reversed.

Step S120 includes: performing interpolation on each pixel of the target image according to the first correction parameter and the second correction parameter to obtain a corresponding correction parameter, and correcting the target image according to the corresponding correction parameters.

Specifically, step S120 includes: performing linear interpolation on each pixel of the target image according to a distance between the pixel and an edge of the target image at the first side of the target image, and a distance between the pixel and an edge of the target image at the second side of the target image, to obtain the corresponding correction parameter, and correcting the target image according to the corresponding correction parameters. The corrected target image is M.

For example, a gamma correction parameter for the edge at the first side is a first correction parameter GammaL (which is obtained by fitting the target image and the first image), a gamma correction parameter for the edge at the second side is a second correction parameter GammaR (which is obtained by fitting the target image and the second image), the distance between a pixel P and the edge at the first side is dL, and the distance between the pixel P and the edge at the second side is dR, and the correction parameter of the pixel P is:

$$(dR*GammaL+dL*GammaR)/(dL+dR) \quad (1).$$

Figure 3:
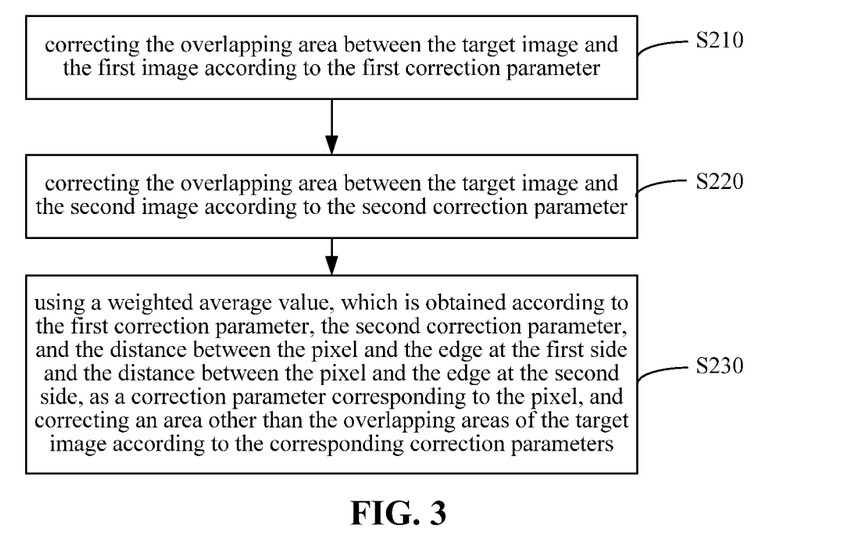
FIG. 3 is a schematic flowchart of a step of performing linear interpolation on each pixel of a target image according to a distance between the pixel and an edge of the target image at a first side of the target image, and a distance between the pixel and an edge of the target image at a second side of the target image, to obtain a corresponding correction parameter, and correcting the target image according to the corresponding correction parameters.

Furthermore, as shown in FIG. 3, in an embodiment, the step of performing linear interpolation on each pixel of the target image according to a distance between the pixel and an edge of the target image at a first side of the target image, and a distance between the pixel and an edge of the target image at a second side of the target image, to obtain the corresponding correction parameter, and correcting the target image according to the corresponding correction parameters includes steps 210 to 230.

Step S210 includes: correcting the overlapping area between the target image and the first image according to the first correction parameter.

It may be known from the formula (1) that the correction parameter of each pixel of the overlapping area between the target image and the first image is equivalent to the first correction parameter. The luminance of the overlapping area between the target image I and the second image is corrected to be the luminance of the first image L.

Step S220 includes: correcting the overlapping area between the target image and the second image according to the second correction parameter.

It may be known from the formula (1) that the correction parameter of each pixel of the overlapping area between the target image and the second image is equivalent to the second correction parameter. The luminance of the overlapping area between the target image I and the second image is corrected to be the luminance of the second image R.

Step S230 includes: using a weighted average value, which is obtained according to the first correction parameter, the second correction parameter, and the distance between the pixel and the edge at the first side and the distance between the pixel and the edge at the second side, as a correction parameter corresponding to the pixel, and correcting an area other than the overlapping areas of the target image according to the corresponding correction parameters.

Specifically, the distance between each pixel and the edge at the first side and the distance between the pixel and the edge at the second side may be calculated according to the formula (1), and the pixel is weighted according to the distances, the first correction parameter, and the second correction parameter to obtain the weighted average value of the pixel.

Step S130 includes: fitting an overlapping area between the corrected target image and the first image to obtain a first RGB three-channel linear transformation parameter, and fitting an overlapping area between the corrected target image and the second image to obtain a second RGB three-channel linear transformation parameter.

Specifically, for RGB, R is red, G is green, and B is blue, which are three primary colors.

Figure 4:
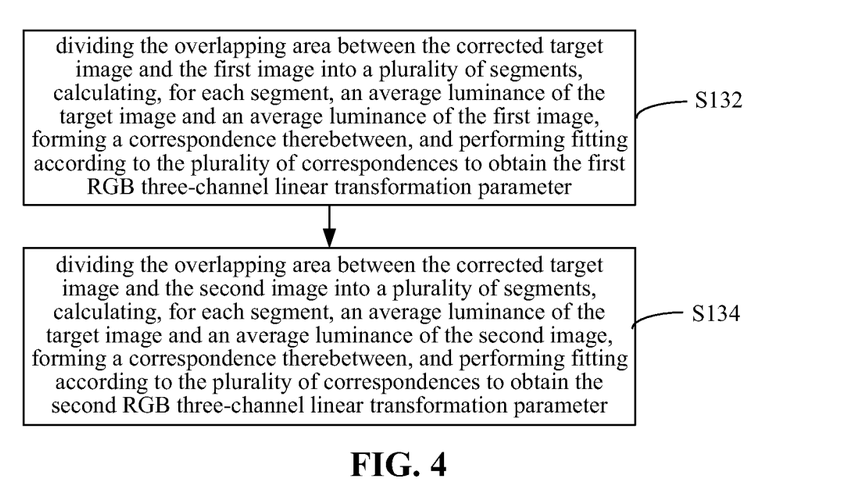
FIG. 4 is a schematic flowchart of a step of fitting an overlapping area between a corrected target image and a first image to obtain a first RGB three-channel linear transformation parameter, and fitting an overlapping area between the corrected target image and a second image to obtain a second RGB three-channel linear transformation parameter.

Furthermore, in an embodiment, as shown in FIG. 4, step S130 includes steps 132 and 134.

Step S132 includes: dividing the overlapping area between the corrected target image and the first image into a plurality of segments, calculating, for each segment, an average luminance of the target image and an average luminance of the first image, forming a correspondence therebetween, and performing fitting according to the plurality of correspondences to obtain the first RGB three-channel linear transformation parameter.

Specifically, the plurality of segments may be set as needed, for example, 10 segments, or 20 segments. Taking 10 segments as an example, the overlapping area between the corrected target image M and the first image L is divided into 10 segments; the average luminance of the corrected target image M and the corresponding average luminance of the first image L in each segment are calculated; the correspondence between the average luminance of the corrected target image M and the average luminance of the first image L in each segment is formed, and therefore, there are ten correspondences; and an optimal RGB three-channel linear transformation parameter, i.e., the first RGB three-channel linear transformation parameter, is obtained by performing fitting using the least square method.

Step S134 includes: dividing the overlapping area between the corrected target image and the second image into a plurality of segments, calculating, for each segment, an average luminance of the target image and an average luminance of the second image, forming a correspondence therebetween, and performing fitting according to the plurality of correspondences to obtain the second RGB three-channel linear transformation parameter.

Specifically, the plurality of segments may be set as needed, for example, 10 segments, or 20 segments. Taking 10 segments as an example, the overlapping area between the corrected target image M and the second image R is divided into 10 segments; the average luminance of the corrected target image M and the corresponding average luminance of the second image R in each segment are calculated; the correspondence between the average luminance of the corrected target image M and the average luminance of the second image R in each segment is formed, and therefore, there are ten correspondences; an optimal RGB three-channel linear transformation parameter, i.e., the second RGB three-channel linear transformation parameter, is obtained by performing fitting using the least square method.

Step S140 includes: performing linear interpolation on each pixel of the corrected target image according to the first RGB three-channel linear transformation parameter and the second RGB three-channel linear transformation parameter, to obtain a corresponding RGB three-channel linear transformation parameter, and transforming the corrected target image according to the corresponding RGB three-channel linear transformation parameters.

Specifically, step S140 includes: performing the linear interpolation on each pixel of the corrected target image according to the distance between the pixel and the edge at the first side and the distance between the pixel and the edge at the second side, to obtain the corresponding RGB three-channel linear transformation parameter, and transforming the corrected target image according to the corresponding RGB three-channel linear transformation parameters.

Figure 5:
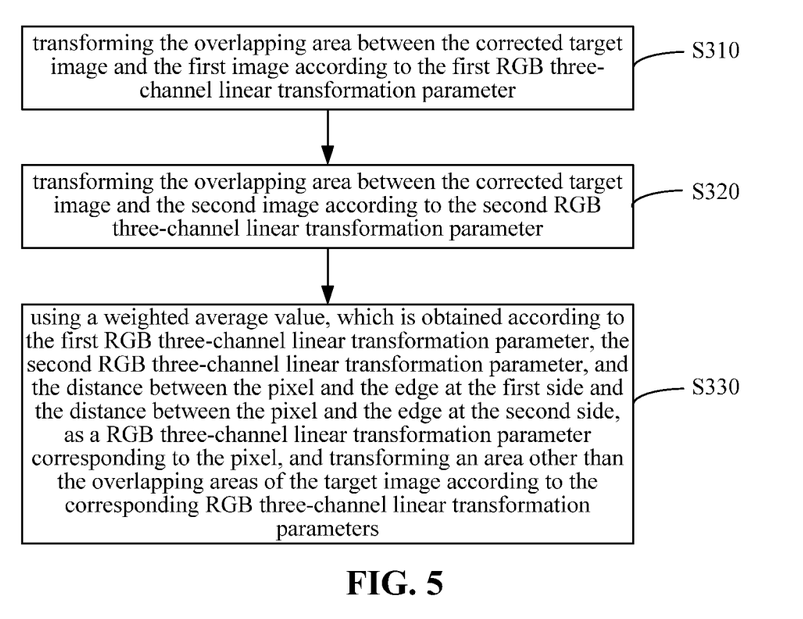
FIG. 5 is a schematic flowchart of a step of performing linear interpolation on each pixel of a corrected target image according to a distance between the pixel and an edge of the target image at a first side of the target image, and a distance between the pixel and an edge of the target image at a second side of the target image, to obtain a corresponding RGB three-channel linear transformation parameter, and transforming the corrected target image according to the corresponding RGB three-channel linear transformation parameters.

Furthermore, as shown in FIG. 5, in an embodiment, the step of performing the linear interpolation on each pixel of the corrected target image according to the distance between the pixel and the edge at the first side and the distance between the pixel and the edge at the second side, to obtain the corresponding RGB three-channel linear transformation parameter, and transforming the corrected target image according to the corresponding RGB three-channel linear transformation parameters includes steps 310 to 330.

Step S310 include: transforming the overlapping area between the corrected target image and the first image according to the first RGB three-channel linear transformation parameter.

The overlapping area between the corrected target image M and the first image L is transformed according to the first RGB three-channel linear transformation parameter, so that the color of the target image M in the overlapping area is transformed into the color of L.

Step S320 includes: transforming the overlapping area between the corrected target image and the second image according to the second RGB three-channel linear transformation parameter.

The overlapping area between the corrected target image M and the second image R is transformed according to the second RGB three-channel linear transformation parameter, so that the color of the target image M in the overlapping area is transformed into the color of R.

Step S330 includes: using a weighted average value, which is obtained according to the first RGB three-channel linear transformation parameter, the second RGB three-channel linear transformation parameter, and the distance between the pixel and the edge at the first side and the distance between the pixel and the edge at the second side, as a RGB three-channel linear transformation parameter corresponding to the pixel, and transforming an area other than the overlapping areas of the target image according to the corresponding RGB three-channel linear transformation parameters.

Similarly, the weighted average value, i.e., the corresponding RGB three-channel linear transformation parameter, of the pixel may be acquired by using the formula (1).

Figure 6:
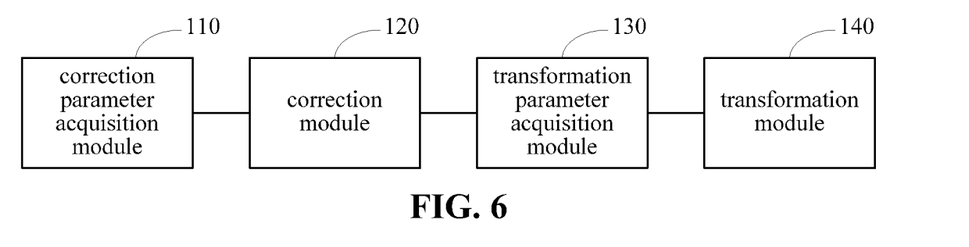
FIG. 6 is a schematic structural diagram of an image tone adjustment apparatus according to an embodiment.

As shown in FIG. 6, in an embodiment, an image tone adjustment apparatus includes a correction parameter acquisition module 110, a correction module 120, a transformation parameter acquisition module 130, and a transformation module 140.

The correction parameter acquisition module 110 is configured to fit an overlapping area between a target image and a first image to obtain a first correction parameter, and fit an overlapping area between the target image and a second image to obtain a second correction parameter. A portion of the target image at a first side overlaps with the first image, and a portion of the target image at a second side overlaps with the second image.

The first image, the target image, and the second image which have continuous content are acquired, where the portion of the target image at the first side overlaps with the first image, and the portion of the target image at the second side overlaps with the second image. For easy description, the first image is L, the target image is I, the second image is R, the first image L overlaps the left portion of the target image I, and the second image R overlaps the right portion of the target image I.

Figure 7:
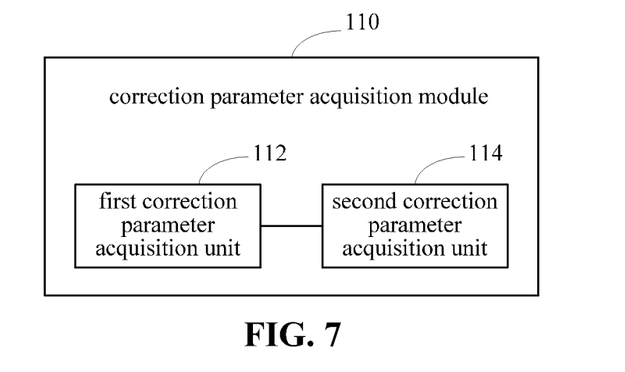
FIG. 7 is a schematic diagram of an internal structure of a correction parameter acquisition module.

As shown in FIG. 7, the correction parameter acquisition module 110 includes a first correction parameter acquisition unit 112 and a second correction parameter acquisition unit 114.

The first correction parameter acquisition unit 112 is configured to divide the overlapping area between the target image and the first image into a plurality of segments, calculate, for each segment, an average luminance of the target image and an average luminance of the first image, form a correspondence therebetween, and perform fitting according to the plurality of correspondences to obtain the first correction parameter.

Specifically, the plurality of segments may be set as needed, for example, 10 segments, or 20 segments. Taking 10 segments as an example, the overlapping area between the target image I and the first image L is divided into 10 segments; the average luminance of the target image I and the corresponding average luminance of the first image L in each segment are calculated, a correspondence between the average luminance of the target image I and the average luminance of the first image L in each segment is formed, and therefore, there are ten correspondences; an optimal gamma correction parameter, i.e., the first correction parameter, is obtained by performing fitting using the least square method. Gamma refers to nonlinear correction of an image.

The second correction parameter acquisition unit 114 is configured to divide the overlapping area between the target image and the second image into a plurality of segments, calculate, for each segment, an average luminance of the target image and an average luminance of the second image, form a correspondence therebetween, and perform fitting according to the plurality of correspondences to obtain the second correction parameter.

Specifically, the plurality of segments may be set as needed, for example, 10 segments, or 20 segments. Taking 10 segments as an example, the overlapping area between the target image I and the second image R is divided into 10 segments; the average luminance of the target image I and the corresponding average luminance of the second image R in each segment are calculated; a correspondence between the average luminance of the target image I and the average luminance of the second image R in each segment is formed, and therefore, there are ten correspondences, and an optimal gamma correction parameter, i.e., the second correction parameter, is obtained by performing fitting using the least square method.

The correction module 120 is configured to perform interpolation on each pixel of the target image according to the first correction parameter and the second correction parameter to obtain a corresponding correction parameter, and correct the target image according to the corresponding correction parameters.

Specifically, the correction module 120 is further configured to perform linear interpolation on each pixel of the target image according to a distance between the pixel and an edge of the target image at the first side of the target image, and a distance between the pixel and an edge of the target image at the second side of the target image, to obtain the corresponding correction parameter, and correcting the target image according to the corresponding correction parameters. The corrected target image is M.

For example, a gamma correction parameter for the edge at the first side is a first correction parameter GammaL (which is obtained by fitting the target image and the first image), a gamma correction parameter for the edge at the second side is a second correction parameter GammaR (which is obtained by fitting the target image and the second image), the distance between a pixel P and the edge at the first side is dL, and the distance between the pixel P and the edge at the second side is dR, and a correction parameter of a point P is:

$$(dR*GammaL+dL*GammaR)/(dL+dR) \qquad (1).$$

The correction module 120 is further configured to correct the overlapping area between the target image and the first image according to the first correction parameter; correct the overlapping area between the target image and the second image according to the second correction parameter; and use a weighted average value, which is obtained according to the first correction parameter, the second correction parameter, and the distance between the pixel and the edge at the first side and the distance between the pixel and the edge at the second side, as a correction parameter corresponding to the pixel, and correct an area other than the overlapping areas of the target image according to the corresponding correction parameters.

Specifically, from the formula (1), it may be known that the correction parameter of each pixel of the overlapping area between the target image and the first image is equivalent to the first correction parameter, and the correction parameter of each pixel of the overlapping area between the target image and the second image is equivalent to the second correction parameter; and the distance between each pixel and the edge at the first side and the distance between the pixel and the edge at the second side may be calculated, and the pixel is weighted according to the distances, the first correction parameter, and the second correction parameter to obtain the weighted average value of the pixel.

The transformation parameter acquisition module 130 is configured to fit an overlapping area between the corrected target image and the first image to obtain a first RGB three-channel linear transformation parameter, and fit an overlapping area between the corrected target image and the second image to obtain a second RGB three-channel linear transformation parameter.

Specifically, for RGB, R is red, G is green, and B is blue, which are three primary colors.

Figure 8:
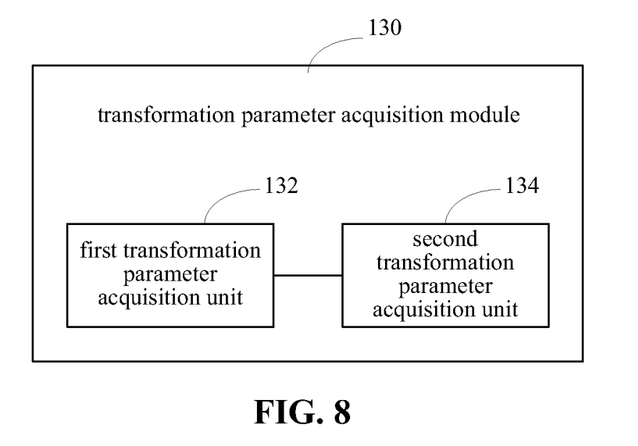
FIG. 8 is a schematic diagram of an internal structure of a transformation parameter acquisition module.

As shown in FIG. 8, the transformation parameter acquisition module 130 includes a first transformation parameter acquisition unit 132 and a second transformation parameter acquisition unit 134.

The first transformation parameter acquisition unit 132 is configured to divide the overlapping area between the corrected target image and the first image into a plurality of segments, calculate, for each segment, an average luminance of the target image and an average luminance of the first image, form a correspondence therebetween, and perform fitting according to the plurality of correspondences to obtain the first RGB three-channel linear transformation parameter.

Specifically, the plurality of segments may be set as needed, for example, 10 segments, or 20 segments. Taking 10 segments as an example, the overlapping area between the corrected target image M and the first image L is divided into 10 segments; the average luminance of the corrected target image M and the corresponding average luminance of the first image L in each segment are calculated; the correspondence between the average luminance of the corrected target image M and the average luminance of the first image L in each segment is formed, and therefore, there are ten correspondences; and an optimal RGB three-channel linear transformation parameter, i.e., the first RGB three-channel linear transformation parameter, is obtained by performing fitting using the least square method.

The second transformation parameter acquisition unit 134 is configured to divide the overlapping area between the corrected target image and the second image into a plurality of segments, calculate, for each segment, an average luminance of the target image and an average luminance of the second image, form a correspondence therebetween, and perform fitting according to the plurality of correspondences to obtain the second RGB three-channel linear transformation parameter.

Specifically, the plurality of may be set as needed, for example, 10 segments, or 20 segments. Taking 10 segments as an example, the overlapping area between the corrected target image M and the second image R is divided into 10 segments; the average luminance of the corrected target image M and the corresponding average luminance of the second image R in each segment are calculated; the correspondence between the average luminance of the corrected target image M and the average luminance of the second image R in each segment is formed, and therefore, there are ten correspondences; an optimal RGB three-channel linear transformation parameter, i.e., the second RGB three-channel linear transformation parameter, is obtained by performing fitting using the least square method.

The transformation module 140 is configured to perform linear interpolation on each pixel of the corrected target image according to the first RGB three-channel linear transformation parameter and the second RGB three-channel linear transformation parameter, to obtain a corresponding RGB three-channel linear transformation parameter, and transform the corrected target image according to the corresponding RGB three-channel linear transformation parameters.

Further, the transformation module 140 is further configured to perform the linear interpolation on each pixel of the corrected target image according to the distance between the pixel and the edge at the first side and the distance between the pixel and the edge at the second side, to obtain the corresponding RGB three-channel linear transformation parameter, and transform the corrected target image according to the corresponding RGB three-channel linear transformation parameters.

Furthermore, the transformation module 140 is further configured to transform the overlapping area between the corrected target image and the first image according to the first RGB three-channel linear transformation parameter; transform the overlapping area between the corrected target image and the second image according to the second RGB three-channel linear transformation parameter; and use a weighted average value, which is obtained according to the first RGB three-channel linear transformation parameter, the second RGB three-channel linear transformation parameter, and the distance between the pixel and the edge at the first side and the distance between the pixel and the edge at the second side, as a RGB three-channel linear transformation parameter corresponding to the pixel, and transform an area other than the overlapping areas of the target image according to the corresponding RGB three-channel linear transformation parameters.

Similarly, the weighted average value, i.e., the corresponding RGB three-channel linear transformation parameter of the pixel, may be acquired by using the formula (1).

According to the foregoing image tone adjustment method and the apparatus thereof, an overlapping area between a target image and a first image is fitted to obtain a first correction parameter, and an overlapping area between the target image and a second image is fitted to obtain a second correction parameter; linear interpolation is performed on each pixel of the target image according to the first correction parameter and the second correction parameter to obtain a corresponding correction parameter, and the target image is corrected according to the corresponding correction parameters; an overlapping area between the corrected target image and the first image is fitted to obtain a first RGB three-channel linear transformation parameter, and an overlapping area between the corrected target image and the second image is fitted to obtain a second RGB three-channel linear transformation parameter; thereby obtaining a RGB three-channel linear transformation parameter corresponding to each pixel is then obtained, and the target image is transformed according to the transformation parameters. In this way, the luminance of the first image, the target image, and the second image can be adjusted to be consistent, and color transition is smooth.

A person of ordinary skill in the art may understand that all or part of the processes of the foregoing method embodiments may be achieved by instructing related hardware modules by using the computer readable instructions. The computer readable instructions may be stored in a computer readable storage medium. The processes of the foregoing method embodiments may be implemented by performing the computer readable instructions. The storage medium may be a magnetic disk, an optical disc, a read-only memory (ROM), or a random access memory (RAM), etc.

The foregoing descriptions are embodiments of the disclosure, but are not intended to limit the disclosure. Some modifications and improvements may be made by those skilled in the art within the spirit and scope of the disclosure, and these modifications and improvements fall in the scope of the disclosure. The scope of the disclosure should be subjected to the appended claims.

The invention claimed is:

1. An image tone adjustment method, performed by a computer having computer-readable instructions stored therein, such that the computer-readable instructions configure the computer to perform the method, comprising:
   fitting, by an image tone adjustment apparatus, an overlapping area between a target image and a first image to obtain a first correction parameter, and fitting an overlapping area between the target image and a second image to obtain a second correction parameter, wherein a portion of the target image at a first side overlaps with the first image, and a portion of the target image at a second side overlaps with the second image;
   performing interpolation, by the image tone adjustment apparatus, on each pixel of the target image according to the first correction parameter and the second correction parameter to obtain a corresponding correction parameter, and correcting the target image according to the corresponding correction parameters;
   fitting, by the image tone adjustment apparatus, an overlapping area between the corrected target image and the first image to obtain a first RGB three-channel linear transformation parameter, and fitting an overlapping area between the corrected target image and the second image to obtain a second RGB three-channel linear transformation parameter, wherein for RGB, R is red, G is green, and B is blue; and
   performing linear interpolation, by the image tone adjustment apparatus, on each pixel of the corrected target image according to the first RGB three-channel linear transformation parameter and the second RGB three-channel linear transformation parameter, to obtain a corresponding RGB three-channel linear transformation parameter, and transforming the corrected target image according to the corresponding RGB three-channel linear transformation parameters.

2. The image tone adjustment method according to claim 1, further comprising: dividing the overlapping area between the target image and the first image into a plurality of segments, calculating, for each segment, an average luminance of the target image and an average luminance of the first image, forming a correspondence therebetween, and performing fitting according to the plurality of correspondences to obtain the first correction parameter; and
   dividing the overlapping area between the target image and the second image into a plurality of segments, calculating, for each segment, an average luminance of the target image and an average luminance of the second image, forming a correspondence therebetween, and performing fitting according to the plurality of correspondences to obtain the second correction parameter.

3. The image tone adjustment method according to claim 1, further comprising:
   performing linear interpolation on each pixel of the target image according to a distance between the pixel and an edge of the target image at the first side of the target image, and a distance between the pixel and an edge of the target image at the second side of the target image, to obtain the corresponding correction parameter, and correcting the target image according to the corresponding correction parameters.

4. The image tone adjustment method according to claim 3, further comprising: correcting the overlapping area between the target image and the first image according to the first correction parameter;
   correcting the overlapping area between the target image and the second image according to the second correction parameter; and
   using a weighted average value, which is obtained according to the first correction parameter, the second correction parameter, and the distance between the pixel and the edge at the first side and the distance between the pixel and the edge at the second side, as a correction parameter corresponding to the pixel, and correcting an area other than the overlapping areas of the target image according to the corresponding correction parameters.

5. The image tone adjustment method according to claim 1, further comprising:
   dividing the overlapping area between the corrected target image and the first image into a plurality of segments, calculating, for each segment, an average luminance of the target image and an average luminance of the first image, forming a correspondence therebetween, and performing fitting according to the plurality of correspondences to obtain the first RGB three-channel linear transformation parameter; and dividing the overlapping area between the corrected target image and the second image into a plurality of segments, calculating for each segment, an average luminance of the target image and an average luminance of the second image, forming a correspondence therebetween, and performing fitting according to the plurality of correspondences to obtain the second RGB three-channel linear transformation parameter.

6. The image tone adjustment method according to claim 1, further comprising:
performing the linear interpolation according to the distance between each pixel and the edge at the first side and the distance between the pixel and the edge at the second side, to obtain the corresponding RGB three-channel linear transformation parameter, and transforming the corrected target image according to the corresponding RGB three-channel linear transformation parameters.

7. The image tone adjustment method according to claim 6, further comprising: transforming the overlapping area between the corrected target image and the first image according to the first RGB three-channel linear transformation parameter;
transforming the overlapping area between the corrected target image and the second image according to the second RGB three-channel linear transformation parameter; and
using a weighted average value, which is obtained according to the first RGB three-channel linear transformation parameter, the second RGB three-channel linear transformation parameter, and the distance between the pixel and the edge at the first side and the distance between the pixel and the edge at the second side, as a RGB three-channel linear transformation parameter corresponding to the pixel, and transforming an area other than the overlapping areas of the target image according to the corresponding RGB three-channel linear transformation parameters.

8. An image tone adjustment apparatus, comprising:
a processor and memory machine-readable instruction code stored therein, wherein the processor executes the code to comprise:
a correction parameter acquisition module that fits an overlapping area between a target image and a first image to obtain a first correction parameter, and that fits an overlapping area between the target image and a second image to obtain a second correction parameter, a portion of the target image at a first side overlaps with the first image, and a portion of the target image at a second side overlaps with the second image;
a correction module that performs interpolation on each pixel of the target image according to the first correction parameter and the second correction parameter to obtain a corresponding correction parameter, and that corrects the target image according to the corresponding correction parameters;
a transformation parameter acquisition module that fits an overlapping area between the corrected target image and the first image to obtain a first RGB three-channel linear transformation parameter, and that fits an overlapping area between the corrected target image and the second image to obtain a second RGB three-channel linear transformation parameter, wherein for RGB, R is red, G is green, and B is blue; and
a transformation module that performs linear interpolation on each pixel of the corrected target image according to the first RGB three-channel linear transformation parameter and the second RGB three-channel linear transformation parameter, to obtain a corresponding RGB three-channel linear transformation parameter, and that transforms the corrected target image according to the corresponding RGB three-channel linear transformation parameters.

9. The image tone adjustment apparatus according to claim 8, wherein the correction parameter acquisition module comprises:
a first correction parameter acquisition unit that divides the overlapping area between the target image and the first image into a plurality of segments, that calculates, for each segment, an average luminance of the target image and an average luminance of the first image, that forms a correspondence therebetween, and that performs fitting according to the plurality of correspondences to obtain the first correction parameter; and
a second correction parameter acquisition unit that divides the overlapping area between the target image and the second image into a plurality of segments, that calculates, for each segment, an average luminance of the target image and an average luminance of the second image, that forms a correspondence therebetween, and that performs fitting according to the plurality of correspondences to obtain the second correction parameter.

10. The image tone adjustment apparatus according to claim 8, wherein the correction module performs linear interpolation on each pixel of the target image according to a distance between the pixel and an edge of the target image at the first side of the target image, and a distance between the pixel and an edge of the target image at the second side of the target image, to obtain the corresponding correction parameter, and corrects the target image according to the corresponding correction parameters.

11. The image tone adjustment apparatus according to claim 10, wherein the correction module corrects the overlapping area between the target image and the first image according to the first correction parameter; corrects the overlapping area between the target image and the second image according to the second correction parameter; and uses a weighted average value, which is obtained according to the first correction parameter, the second correction parameter, and the distance between the pixel and the edge at the first side and the distance between the pixel and the edge at the second side, as a correction parameter corresponding to the pixel, and corrects an area other than the overlapping areas of the target image according to the corresponding correction parameters.

12. The image tone adjustment apparatus according to claim 8, wherein the transformation parameter acquisition module comprises:
a first transformation parameter acquisition unit that divides the overlapping area between the corrected target image and the first image into a plurality of segments, that calculates, for each segment, an average luminance of the target image and an average luminance of the first image, that forms a correspondence therebetween, and that performs fitting according to the plurality of correspondences to obtain the first RGB three-channel linear transformation parameter; and
a second transformation parameter acquisition unit that divides the overlapping area between the corrected target image and the second image into a plurality of segments, that calculates, for each segment, an average luminance of the target image and an average luminance of the second image, that forms a correspondence therebetween, and that performs fitting according to the plurality of correspondences to obtain the second RGB three-channel linear transformation parameter.

13. The image tone adjustment apparatus according to claim 8, wherein the transformation module performs the linear interpolation on each pixel of the corrected target image according to a distance between the pixel and an edge at the first side and a distance between the pixel and an edge at the second side, to obtain a corresponding RGB three-channel linear transformation parameter, and transforms the corrected target image according to the corresponding RGB three-channel linear transformation parameters.

14. The image tone adjustment apparatus according to claim 13, wherein the transformation module transforms the overlapping area between the corrected target image and the first image according to the first RGB three-channel linear transformation parameter; transforms the overlapping area between the corrected target image and the second image according to the second RGB three-channel linear transformation parameter; and uses a weighted average value, which is obtained according to the first RGB three-channel linear transformation parameter, the second RGB three-channel linear transformation parameter, and the distance between the pixel and the edge at the first side and the distance between the pixel and the edge at the second side, as a RGB three-channel linear transformation parameter corresponding to the pixel, and transforms an area other than the overlapping areas of the target image according to the corresponding RGB three-channel linear transformation parameters.

15. A non-transitory computer-readable storage medium comprising computer-executable instructions, wherein the computer-executable instructions are used for executing the following steps:
fitting an overlapping area between a target image and a first image to obtain a first correction parameter, and fitting an overlapping area between the target image and a second image to obtain a second correction parameter, wherein a portion of the target image at a first side overlaps with the first image, and a portion of the target image at a second side overlaps with the second image;
performing interpolation on each pixel of the target image according to the first correction parameter and the second correction parameter to obtain a corresponding correction parameter, and correcting the target image according to the corresponding correction parameters;
fitting an overlapping area between the corrected target image and the first image to obtain a first RGB three-channel linear transformation parameter, and fitting an overlapping area between the corrected target image and the second image to obtain a second RGB three-channel linear transformation parameter, wherein for RGB, R is red, G is green, and B is blue; and
performing linear interpolation on each pixel of the corrected target image according to the first RGB three-channel linear transformation parameter and the second RGB three-channel linear transformation parameter, to obtain a corresponding RGB three-channel linear transformation parameter, and transforming the corrected target image according to the corresponding RGB three-channel linear transformation parameters.

16. The non-transitory computer-readable storage medium according to claim 15, wherein the step of fitting an overlapping area between a target image and a first image to obtain a first correction parameter, and fitting an overlapping area between the target image and a second image to obtain a second correction parameter comprises:
dividing the overlapping area between the target image and the first image into a plurality of segments, calculating, for each segment, an average luminance of the target image and an average luminance of the first image, forming a correspondence therebetween, and performing fitting according to the plurality of correspondences to obtain the first correction parameter; and
dividing the overlapping area between the target image and the second image into a plurality of segments, calculating, for each segment, an average luminance of the target image and an average luminance of the second image, forming a correspondence therebetween, and performing fitting according to the plurality of correspondences to obtain the second correction parameter.

17. The non-transitory computer-readable storage medium according to claim 15, wherein the step of performing interpolation on each pixel in the target image according to the first correction parameter and the second correction parameter to obtain a corresponding correction parameter, and correcting the target image according to the corresponding correction parameters comprises:
performing linear interpolation on each pixel of the target image according to a distance between the pixel and an edge of the target image at the first side of the target image, and a distance between the pixel and an edge of the target image at the second side of the target image, to obtain the corresponding correction parameter, and correcting the target image according to the corresponding correction parameters.

18. The non-transitory computer-readable storage medium according to claim 17, wherein the step of performing linear interpolation on each pixel of the target image according to a distance between the pixel and an edge of the target image at the first side of the target image, and a distance between the pixel and an edge of the target image at the second side of the target image, to obtain the corresponding correction parameter, and correcting the target image according to the corresponding correction parameters comprises:
correcting the overlapping area between the target image and the first image according to the first correction parameter;
correcting the overlapping area between the target image and the second image according to the second correction parameter; and
using a weighted average value, which is obtained according to the first correction parameter, the second correction parameter, and the distance between the pixel and the edge at the first side and the distance between the pixel and the edge at the second side, as a correction parameter corresponding to the pixel, and correcting an area other than the overlapping areas of the target image according to the corresponding correction parameters.

19. The non-transitory computer-readable storage medium according to claim 15, wherein the step of fitting an overlapping area between the corrected target image and the first image to obtain a first RGB three-channel linear transformation parameter, and fitting an overlapping area between the corrected target image and the second image to obtain a second RGB three-channel linear transformation parameter comprises:
dividing the overlapping area between the corrected target image and the first image into a plurality of segments, calculating, for each segment, an average luminance of the target image and an average luminance of the first image, forming a correspondence therebetween, and performing fitting according to the plurality of correspondences to obtain the first RGB three-channel linear transformation parameter; and dividing the overlapping area between the corrected target image and the second image into a plurality of segments, calculating for each segment, an average luminance of the target image and an average luminance of the second image, forming a correspondence therebetween, and performing fitting according to the plurality of correspondences to obtain the second RGB three-channel linear transformation parameter.

20. The non-transitory computer-readable storage medium according to claim 15, wherein the step of performing linear interpolation on each pixel of the corrected target image according to the first RGB three-channel linear transformation parameter and the second RGB three-channel linear transformation parameter, to obtain a corresponding RGB three-channel linear transformation parameter, and transforming the corrected target image according to the corresponding RGB three-channel linear transformation parameters comprises:

performing the linear interpolation according to the distance between each pixel and the edge at the first side and the distance between the pixel and the edge at the second side, to obtain the corresponding RGB three-channel linear transformation parameter, and transforming the corrected target image according to the corresponding RGB three-channel linear transformation parameter.

* * * * *